(12) United States Patent
Loniewski et al.

(10) Patent No.: US 9,630,856 B2
(45) Date of Patent: Apr. 25, 2017

(54) WATER FILTER FAUCET AND CARTRIDGE THEREFOR

(76) Inventors: Grzegorz Loniewski, Mount Prospect, IL (US); Scott Anthony Nightlinger, Arlington Heights, IL (US); Agnieszka Monika Loniewska, Mount Prospect, IL (US); Piotr Loniewski, Warsaw (PL)

( * ) Notice: Subject to any disclaimer, the term of this patent is extended or adjusted under 35 U.S.C. 154(b) by 1219 days.

(21) Appl. No.: 13/446,421

(22) Filed: Apr. 13, 2012

(65) Prior Publication Data
US 2013/0168309 A1 Jul. 4, 2013

Related U.S. Application Data

(60) Provisional application No. 61/517,166, filed on Apr. 14, 2011.

(51) Int. Cl.
*B01D 35/02* (2006.01)
*E03C 1/01* (2006.01)
*C02F 1/00* (2006.01)
*E03C 1/04* (2006.01)

(52) U.S. Cl.
CPC ............ *C02F 1/003* (2013.01); *E03C 1/0404* (2013.01); *B01D 35/02* (2013.01); *C02F 2201/004* (2013.01); *C02F 2201/006* (2013.01); *C02F 2307/06* (2013.01); *E03C 2201/40* (2013.01)

(58) Field of Classification Search
CPC .............. E03C 1/0404; E03C 2201/40; C02F 2201/004; C02F 2201/006; C02F 1/003; C02F 2307/06; B01D 35/04; B01D 35/02; B01D 29/88; B01D 27/00

USPC ................ 210/418, 435, 449, 446, 282, 429
See application file for complete search history.

(56) References Cited

U.S. PATENT DOCUMENTS

| | | | |
|---|---|---|---|
| 54,347 A | 5/1866 | Hillegass |
| 159,008 A | 1/1875 | Wilson |
| 241,427 A | 5/1881 | Sack |
| 383,493 A | 5/1888 | Sargent |
| 470,004 A | 3/1892 | Luse |
| 505,340 A | 9/1893 | Wilson |
| 701,943 A | 6/1902 | Ryan |

(Continued)

OTHER PUBLICATIONS http://mywell.net/MYWELL11E.html
(Continued)

*Primary Examiner* — Madeline Gonzalez
(74) *Attorney, Agent, or Firm* — John C. Shepard

(57) ABSTRACT

A water treatment assembly generally in the form of a filter faucet generally of the type mounted on a sink or similar countertop surface. The water treatment assembly generally comprises a mounted valve assembly, an inline water filter, and a water spout. The inline water filter is configured intermediate the mounted valve assembly and the spout. The inline water filter has a watertight shell comprising a water inflow port and a water outflow port that allow the filter to be used as a readily replaceable and disposable modular filter cartridge. The filter inflow port allows for releasable fluid engagement with the valve assembly. The filter outflow port comprises a fitting for receiving the spout. Water flow through the filter and spout is controlled by the valve assembly. The combined assembly permits the new use of standard components improved in a cost effective manner to form a reliable filter faucet.

1 Claim, 11 Drawing Sheets

(56) References Cited

U.S. PATENT DOCUMENTS

| | | | |
|---|---|---|---|
| 712,868 A | 11/1902 | Traxton | |
| 1,139,331 A | 5/1915 | Boulard | |
| 1,958,073 A | 5/1934 | Seidel | |
| 2,042,106 A | 5/1934 | Knight | |
| 3,184,064 A | 5/1965 | Sampson | |
| 3,342,340 A | 9/1967 | Shindell | |
| 3,653,689 A | 4/1972 | Sapy | |
| 3,760,951 A | 9/1973 | Mansfield | |
| 4,005,883 A | 2/1977 | Guest | |
| 4,212,743 A | 7/1980 | Van Meter | |
| 4,416,775 A | 11/1983 | Halbich | |
| 4,573,716 A | 3/1986 | Guest | |
| 4,588,214 A | 5/1986 | Guest | |
| 4,603,001 A | 7/1986 | Ward | |
| 4,606,783 A | 8/1986 | Guest | |
| 4,606,823 A | 8/1986 | Lucas | |
| 4,637,636 A | 1/1987 | Guest | |
| 4,645,246 A | 2/1987 | Guest | |
| 4,698,164 A | 10/1987 | Ellis | |
| 4,717,476 A | 1/1988 | Scott | |
| 4,804,467 A | 2/1989 | Losos | |
| 4,981,586 A | 1/1991 | Bartholomew | |
| D319,288 S | 8/1991 | Spokoiny | |
| 5,061,367 A | 10/1991 | Hatch | |
| 5,126,041 A | 6/1992 | Weber | |
| 5,127,427 A * | 7/1992 | Kajpust | E03B 7/072 137/216 |
| 5,164,085 A | 11/1992 | Spokoiny | |
| 5,271,837 A | 12/1993 | Discepolo | |
| 5,277,805 A | 1/1994 | Ferguson | |
| 5,290,443 A | 3/1994 | Norton | |
| 5,478,122 A | 12/1995 | Seabra | |
| 5,511,830 A | 4/1996 | Olson | |
| D372,069 S | 7/1996 | Brancazio | |
| 5,545,322 A | 8/1996 | Cheng | |
| 5,552,057 A | 9/1996 | Hughes | |
| 5,584,513 A | 12/1996 | Sweeny | |
| 5,656,160 A | 8/1997 | Parise | |
| 5,683,120 A | 11/1997 | Brock | |
| 5,685,981 A | 11/1997 | Koslow | |
| 5,766,462 A | 6/1998 | Jones | |
| 5,843,309 A * | 12/1998 | Mancil | C02F 1/325 210/205 |
| 5,882,515 A | 3/1999 | Lacy | |
| 5,983,938 A | 11/1999 | Bowers | |
| 6,024,867 A | 2/2000 | Parise | |
| 6,065,779 A | 5/2000 | Moner | |
| 6,079,750 A | 6/2000 | Kacines | |
| 6,109,664 A | 8/2000 | Guest | |
| 6,120,691 A | 9/2000 | Mancil | |
| 6,179,130 B1 | 1/2001 | Nguyen | |
| 6,203,697 B1 | 3/2001 | Ferguson | |
| 6,220,298 B1 | 4/2001 | Wu | |
| 6,280,619 B1 | 8/2001 | Lacy | |
| 6,485,641 B1 | 11/2002 | McLeod | |
| 6,532,982 B2 | 3/2003 | Downer | |
| 6,641,727 B1 | 11/2003 | Aldred | |
| 6,872,303 B2 | 3/2005 | Knapp | |
| 6,941,968 B2 | 9/2005 | Vidal | |
| 7,000,894 B2 | 2/2006 | Olson | |
| 7,147,773 B2 | 12/2006 | Mitchell | |
| 7,354,513 B2 * | 4/2008 | Nightlinger | B01D 35/04 210/232 |
| 7,387,137 B2 | 6/2008 | Chung | |
| 7,422,248 B2 | 9/2008 | Guest | |
| 7,441,664 B2 | 10/2008 | Tanner | |
| 7,608,136 B2 | 10/2009 | van der Maas | |
| 7,610,932 B2 | 11/2009 | Olson | |
| 7,662,276 B2 | 2/2010 | Larsson | |
| 2002/0100723 A1 | 8/2002 | Courtney | |
| 2003/0189002 A1 | 10/2003 | Proulx | |
| 2005/0072728 A1 | 4/2005 | Chang | |
| 2010/0089472 A1 | 4/2010 | Meza | |
| 2011/0226679 A1 | 9/2011 | Lackey | |

OTHER PUBLICATIONS http://omnifilter.com/replacement.htm.
http://omnipure.com/cISeries.htm.
http://omnipure.com/kSeries.htm.
http://waterstoneco.com/downloads/specs/1425-C-spec.pdf.
http://www.jadousa.com/assets/documents/jado/install/Install_3600.pdf.
http://www.jadousa.com/assets/documents/jado/parts/Parts_3600.pdf.
http://www.jadousa.com/assets/documents/jado/spec/SpecSheet_3600.pdf.
http://www.omnifilterstore.com/product_detail.asp?T1=OMN+GAC1-SS.
http://www.kingstonbrass.com/images/tech/KS8191CTL_m.pdf.
https://www.wattspremier.com/categories.php?category=Replacement-Filters/In%252dLine-Filters.
USRE37216; Reissue Date: Jun. 12, 2011; Inventor: Koslow.

* cited by examiner

WATER FILTER FAUCET AND CARTRIDGE THEREFOR

CROSS-REFERENCE TO RELATED APPLICATIONS

This application incorporates by reference and claims priority to U.S. Provisional Patent Application No. 61/517,166 filed Apr. 14, 2011.

BACKGROUND OF THE INVENTION

The present invention generally relates to water treatment and filtration devices for installation on a sink surface or countertop in conjunction with residential plumbing systems for improving the quality of potable water for human consumption. More particularly to a countertop filter faucet comprising a water treatment element incorporated therein.

Water consumers are increasingly aware that public water supplies are contaminated with many undesirable chemicals and microorganisms capable of impairing the health of those who consume the water. For example, water supplies in rural agricultural areas often contain nitrate, herbicide, and pesticide runoff from crop treatment. Most municipalities add chlorine to guard against pathogens in the public water supply. There is much discussion among experts over what concentrations of chlorine, nitrates, and pesticides are considered safe. It is generally acknowledged that the water supply would be better without these chemicals. Similarly, water may contain pathogenic microorganisms such as Rotavirus, Giardia, and Cryptosporidium; which may be removed by filtration and chemical treatment. This increased awareness has motivated development of water treatment devices for residential use as an individually controlled and last stage of treatment before consumption.

Water treatment devices of the prior art designed for use on or above the sink surface or countertop are mostly complex and expensive devices with requirements for installation and periodic filter element replacement being intimidating for those users not mechanically inclined. Embodiments intended to reduce complexity have created sinktop nuisances involving faucet mounted filters, faucet mounted diverter valves with tubing, complex and costly bases with large footprints on the sink or countertop, and inefficient filter elements with short lifespans requiring relatively frequent replacement.

Water filter devices comprising a porous filter element or cartridge designed for insertion within a watertight housing are taught in U.S. Pat. Nos. 5,126,041; 5,656,160; 5685981; 6024867; and 6,464,871. These filter devices require a complex watertight housing for the filter element wherein water flows in and around the filter. The housings on most of these remain pressurized and full of water when not in use. The pressurized housings increase design requirements and manufacturing costs while also increasing the potential for leaks. When not in use, water stagnates within the filter housing developing bacterial slime that accumulates over time. This bacterial slime decreases the lifespan of the filter while simultaneously mixing with the treated water that is consumed. The standing water overflows and spills when the filter element is replaced and the housing interior requires cleaning to remove the accumulated bacteria. The bacterial slime accumulation requiring cleaning and water spillage associated with filter element replacement makes the task unpleasant and often unintentionally serves to discourage filter replacement, further leading to postponing the task, resulting in increased bacterial growth and consumption. Thereby minimizing the otherwise significant benefits of owning and using a water filter.

The countertop water treatment device taught in U.S. Pat. No. 7,354,513 solves many of these problems by introducing use of an inline filter combined with a base while simultaneously introducing new disadvantages. This water treatment device suggests a custom base that is complicated in design and requires a custom filter. The base provides female socket engagement with a male inlet filter fitting. This female base connection with a male inlet filter fitting teaches a base structure with an unnecessarily large outer diameter. This large outer diameter of the base consumes a significant amount of material and countertop space. Thereby creating manufacturing inefficiencies in the form of expensive tooling and machining time, and increasing the potential for water leakage through the engaged threads. Similarly, the custom filter outflow port suggests an inefficient, complicated, and custom spout connection. No parts are standard in these complex embodiments, which require all custom made components that are expensive to manufacture resulting in increased cost and decreased availability.

U.S. Patent Application Publication US 2011/0226679 A1 teaches a faucet mounted water filter adapted for countertop use in a filter faucet design. This embodiment creates a large footprint on the sink surface that has the spout connected to the base in a manner not realizing the advantages in the use of an inline filter. This embodiment introduces a complicated structural design that requires expensive tooling and creates manufacturing inefficiencies.

The MyWell filter faucet introduces a compact and custom design. This custom design requires costly tooling and manufacturing considerations while providing a small filter having a relatively short lifespan. The filter spout connected at the base neither suggests nor realizes the advantages in the use of an inline filter.

A water filter combined with a sink faucet is shown in U.S. Pat. No. 5,510,031 by Knauf and U.S. Pat. No. 6,179,130 by Nguyen. The faucet filter taught by Knauf possesses the design and manufacturing inefficiencies mentioned above in relation to a watertight housing for a filter element. Further, Knauf teaches a device having a large footprint on the sink surface requiring a significantly large custom hole that is difficult and costly to make while also increasing the potential for water leakage. Filter replacement requires removing a significantly large and clumsy spout top cover. Nguyen teaches an extremely complicated, costly, and custom faucet spout containing a filter therein. The Nguyen filter similarly being of custom design that increases cost while decreasing availability. Both Knauf and Nguyen teach filter faucets that direct hot water through the water filter even though hot water is known to damage water filter media and may even introduce dangerous bacteria from an improperly set hot water heater. Additionally, water pressure normally provided at the sink faucet is too high for some types of filter media and may create water channels when flowing through the media. Thereby allowing water to flow through without being filtered, completely eliminating the advantages of having the filter.

The filter faucets provided in U.S. Pat. Nos. 6,532,982; 6,641,727; 6941968; and U.S. Application Publication US 2010/0089472 A1 improve upon the disadvantages taught by Knauf and Nguyen by separating the faucet and water supply structure from the sink faucet spout. Each of these shows a filter residing below the countertop that remains accessible from above the countertop for replacement purposes. Each requires structural disassembly or removal of the top portion or spout to replace the filter. Most of these carry over the problems described previously pertaining to a pressurized and watertight filter housing. The slim design being too small for a user's hand to clean the accumulated bacterial slime from within the housing. While the design is slim, it still requires a minimum of about a 1.5-2.0 inch diameter hole in the countertop that is non-standard, must be custom made, must be sealed, and increases the potential for water leakage. All of these require inefficient and custom construction that in most cases is complex and involves costly manufacturing processes for unique and non-standard components. Further, these introduce the potential of water leakage under the sink that may easily go unnoticed by the user feeling secure in having a filter device accessible from above the sink surface while the main body, water compartment, and water connections remain under the counter.

Inline filters exist possessing a watertight shell that remove the need for a separate watertight housing. The watertight shell of these inline water filters typically comprises an axially tubular construction with an inflow port at one end and an outflow port at the other end. Wherein the inflow port and outflow port are generally coaxial.

An example of an inline filter constructed for use within a watertight housing under the counter includes the Omni-Filter model GAC1-SS.

Examples of inline filters constructed for use without a separate watertight housing include the Omnipure CL and K series filters. These Omnipure inline filters are designed for use under the counter or supplying water to a refrigerator ice maker, water spigot, drinking fountain, and similar. The Omnipure CL-series filters comprise internally threaded fittings at both the inflow and outflow ports. The Omnipure K-series filters comprise tubular quick-connect fittings at both the inflow and outflow ports. These K-series fluid fittings are intended for a water tubing connection at both ends while the CL internally threaded fittings are for an adapter at both ends for providing tubing connections. Watts Premier provides similar inline filters. Examples of similar inline water filters described in U.S. Patents include U.S. Pat. Nos. 5,552,057; 5,882,515; and 6,280,619. A key characteristic shared between these inline filters with their own watertight shell being the identical inflow and outflow port fittings for tubing.

These inline filters are neither intended nor suggested for countertop use. They do not possess an inflow port intended or accessible for secure and releasable fluid attachment with a valve or faucet assembly on the sink surface or countertop. Further, they do not possess an outflow port intended or accessible for a fluid connection with a faucet spout.

As can be seen by the many standard, custom, and mechanically complex varieties available in a crowded field; no attempt has been made to adapt known, reliable, and commercially standard components for combined use together as an efficient and low-cost water treatment and filtration assembly for endpoint consumer use with the added benefit of simplifying filter replacement. The many complex prior art water treatment and filtration devices illustrate the well known fact that complex innovation is easy while operable and efficient simplification is difficult and unintuitive. Therefore, the need exists for reliable, long-lasting, and inexpensive water treatment devices that overcome and simplify the disadvantages of the prior art. Particularly countertop devices having inexpensive and disposable watertight filter cartridges that are readily available and easily replaceable, which do not detract from the aesthetics and utility of the sink and surrounding countertop areas.

BRIEF SUMMARY OF THE INVENTION

It is a primary objective of the present invention to provide a reliable, long-lasting, and inexpensive water treatment assembly that corrects and overcomes the disadvantages and problems of the prior art.

It is a secondary objective of the present invention to provide a water treatment assembly generally for residential application comprising a standard inline water filter adapted for new use with a countertop filter faucet assembly.

The present invention provides a water treatment assembly generally in the form of a filter faucet of the type mounted on a sink, countertop, or similar generally horizontal surface. In general, the water treatment assembly comprises an operatively mounted valve assembly, an inline water filter, and a water spout. The inline water filter is configured intermediate the mounted valve assembly and the water spout for treating or filtering the water prior to being discharged through the spout. The inline water filter has a watertight shell comprising a water inflow port and a water outflow port that provide for the filter to be used as a readily replaceable and disposable modular filter cartridge. The filter inflow port allows for releasable fluid engagement of the filter with the valve assembly. The filter outflow port comprises a fitting for receiving the spout. Fluid flow through the filter and spout is controlled by the valve assembly. The combined water treatment assembly permits the new use of common and reliable components being adapted in a cost effective manner to form a reliable filter faucet.

In an exemplary embodiment in accordance with the present invention, the water treatment assembly includes a faucet assembly, an inline water filter, and a faucet spout. The faucet assembly includes a combined means as a water inlet, a valve, and a fluid outlet fitting means as a water outlet. The combined means as a water inlet comprises a means for mounting on and optionally fastening to a sink or similar countertop mounting surface having an opening therethrough, and a means for fluidly coupling with a cold water supply conduit under the mounting surface. The valve being intermediate the faucet assembly water inlet and outlet. The inline water filter has a watertight shell with a water inflow port and a water outflow port. The fluid outlet fitting means of the faucet assembly being for fluid engagement with the filter. The filter inflow port having a fitting for releasably coupling with the fluid outlet fitting means of the faucet assembly. The inline water filter outflow port has a socket fitting for receiving the faucet spout.

The present invention provides a water filter faucet having several unique advantages, superior features, and inherent benefits.

A significant advantage of using an inline water filter for a countertop water treatment assembly being the filter comprises a watertight shell effectively constituting the body of a filter cartridge. The filter cartridge being a modular unit, readily replaceable and disposable, that eliminates the need for and the associated disadvantages of an outer watertight housing for enclosing the filter cartridge body.

Another significant advantage of using an inline water filter being a narrowed filter inflow port structure providing for a minimal point of engagement with a relatively small valve or faucet assembly. This reduces manufacturing costs by reducing machining time and materials, increasing manufacturing efficiency, and reducing the potential for water leakage. Further allowing for a significantly reduced footprint on the sink or countertop mounting surface.

A low-cost and minimal countertop faucet assembly may be constructed for fluid coupling with a correspondingly adapted inflow port of an inline water filter.

A low-cost and disposable spout assembly may be integrated with the outflow port of the inline water filter that allows for the filter cartridge and spout to be replaced together.

Configuring the inline filter downstream of the valve assembly allows for the used filter to be easily replaced simply by disconnecting the filter from the valve assembly outlet when the valve is shut and water flow is stopped. The filter may be easily replaced without tools and without need to go under the sink countertop.

The potential for water leaks are substantially decreased with no need to go under the sink after the filter faucet assembly has been properly installed.

A versatile filter is provided for a filter faucet that may possess any of numerous possible dimensions; wherein height, diameter, and general shape are non-specific.

Standard and low-cost filter cartridges having appropriate modifications may be used having greater filtering capability and lifespan than smaller faucet mounted filter cartridges.

A decorative cover may easily be placed over the filter shell for improved appearance.

An additional mounting configuration possibility may be provided by mounting the faucet assembly to a generally vertical surface such as a wall or sink backsplash. The wall mounted faucet assembly may support the filter cartridge in an angled vertical position or in a horizontal position. Filter media independent of gravity is necessary for mounting the filter in a horizontal position to prevent the formation of an unfiltered water channel that may be caused by gravitational settling of the filter media.

Additional objects, features, and advantages will become apparent from the following description, drawings, and claims.

BRIEF DESCRIPTION OF THE SEVERAL VIEWS OF THE DRAWING

The features of the present invention will become more readily apparent and further understood by reference to the following drawings.

Figure 1:
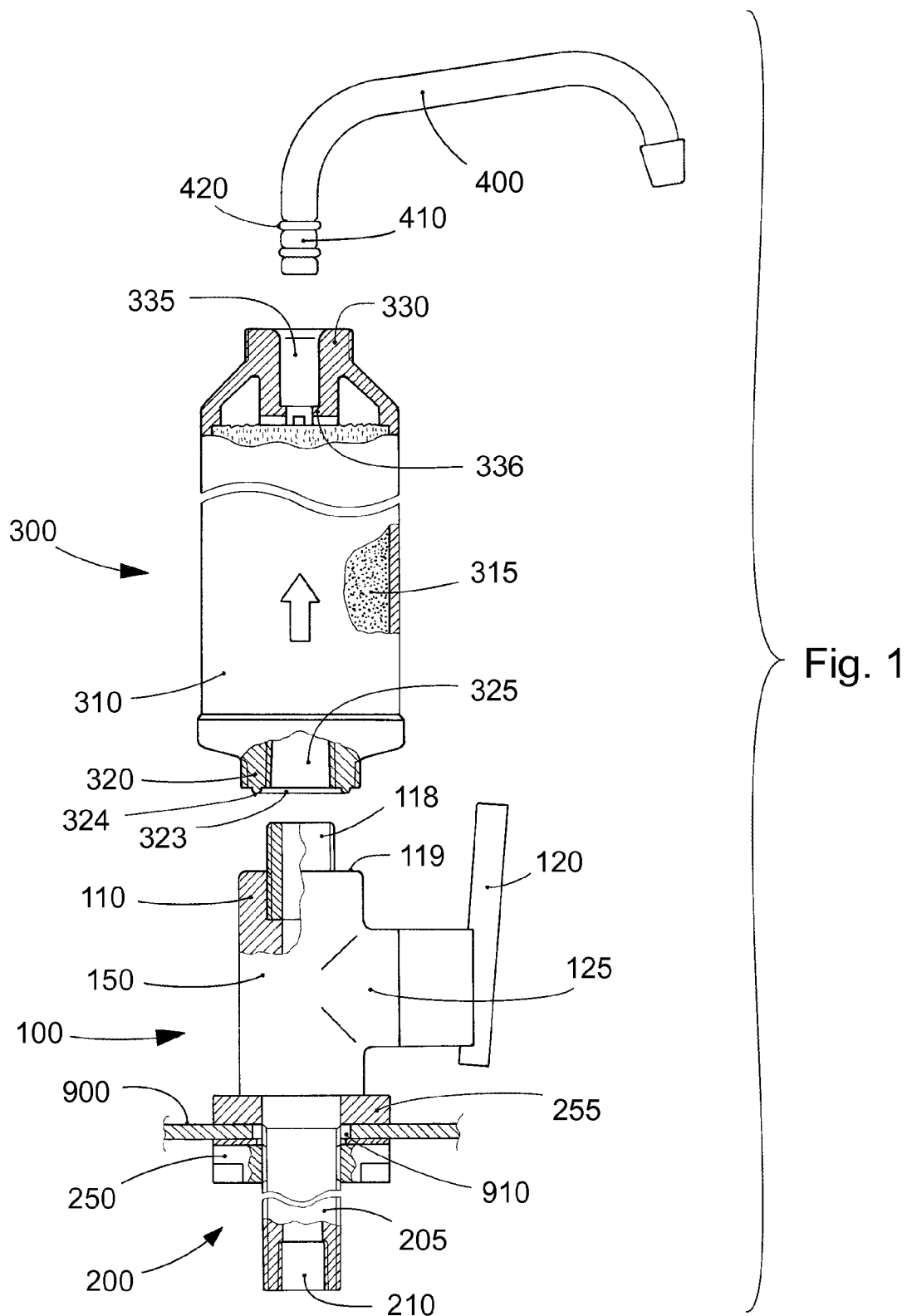
FIG. 1 is an exploded view showing a filter faucet, according to the invention.

PART NUMBERS OF THE DRAWINGS 100 valve assembly, faucet assembly
110 water outlet
114 sealing means
117 socket
118 threaded pipe stub
119 sealing surface
120 valve handle
125 control valve
130 water inlet
140 spacer
150 body
180 fluid passageway
200 combined means
205 threaded pipe, faucet shank
210 water supply connection means
212 threaded fitting
215 compression tube fitting
216 ferrule
217 compression nut
220 fitting
225 outlet portion
230 force flange
231 lower surface
232 upper surface
235 externally threaded pipe
240 escutcheon
250 fastening nut
255 mounting support
260 washer
300 inline filter, cartridge
310 shell
315 filter media, material
320 inflow port
321 gripped surface
323 contact surface
324 sealing means, element
325 inflow port fitting
326 annular groove 327 inflow port outer surface
329 threads
330 outflow port
330a annular portion
331 outlet protrusion
332 threaded fitting
333 contact surface
334 sealing means
335 socket fitting
336 abutment, collar, flange, shoulder
337 outflow port external surface
337a grooves, projections
338 cylindrical bore
339 sealing surface
340 sealing ring
341 groove, channel
342 shoulder
343 packing nut
344 gripped surface
350 bushing
360 inflow end
361 portion, part, end cap
362 shoulder
363 end cap surface
370 outflow end
375 top flat surface
380 collet
381 collet arms, resilient arms
382 flange shoulder
385 teeth, gripping elements
390 bushing
392 cam surface
395 locking mechanism
397 bushing, packing sleeve
398 compression nut
400 faucet spout
410 spout inlet end
410a spout inlet end
415 spout inlet outer surface
420 spout sealing means, o-ring
500 decorative cap
600 adapter
610 sealing gasket, member
800 water supply conduit
900 mounting surface, sink, countertop
910 mounting hole, opening
955 gasket
960 compression nut
962 gripped surface
965 force flange

DETAILED DESCRIPTION OF THE INVENTION

The inventive water treatment assembly is generally in the form of a water filter faucet. Exemplary embodiments of the inventive filter faucet are shown in FIGS. 1, 2, 3, and 4, according to the invention. In general, each embodiment includes a valve assembly 100 generally in the form of a faucet assembly, a combined means 200, a disposable inline filter 300, and a water spout 400.

Figure 2:
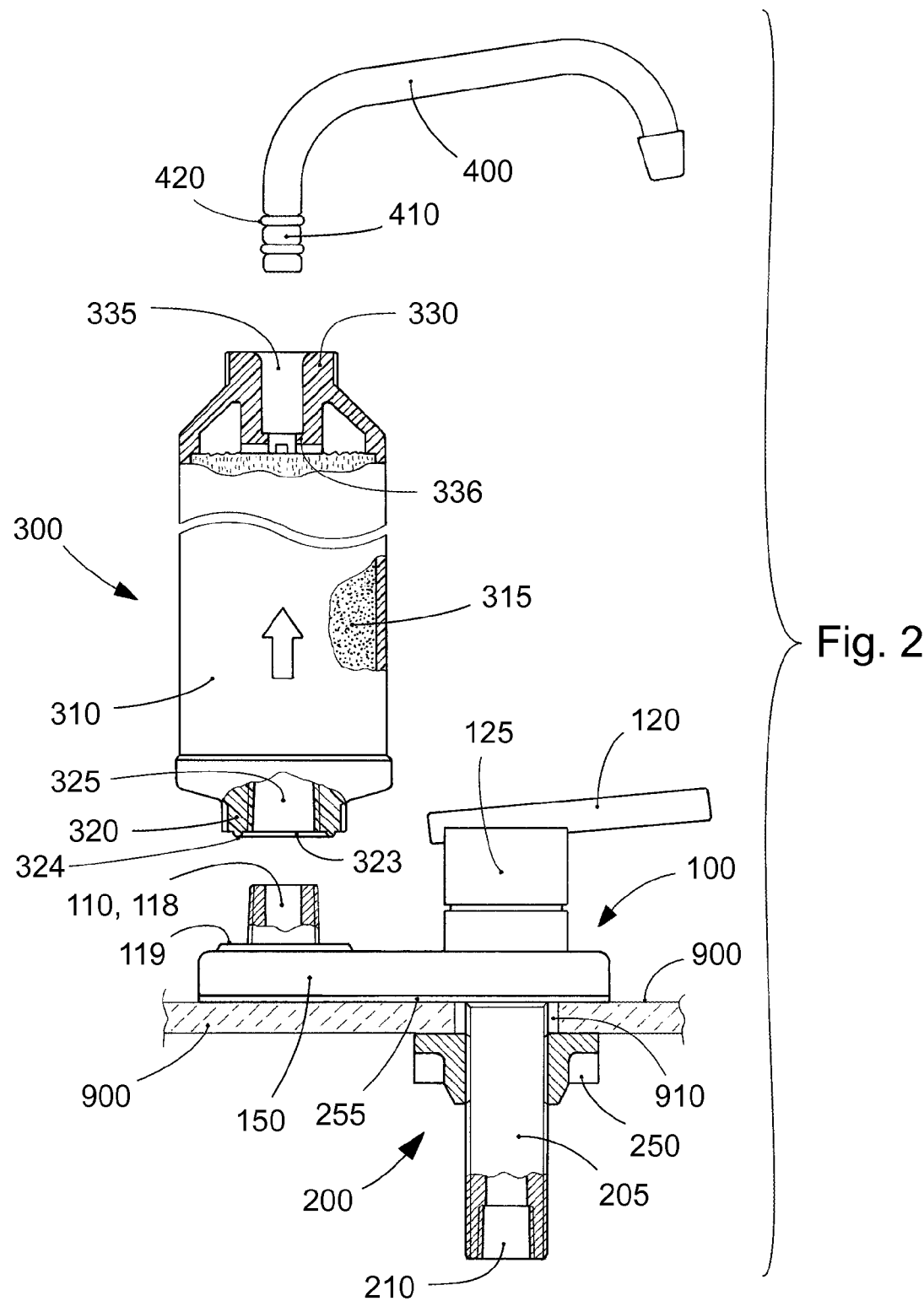
FIG. 2 is an exploded view showing an alternative embodiment of the filter faucet, according to the invention.
Figure 3:
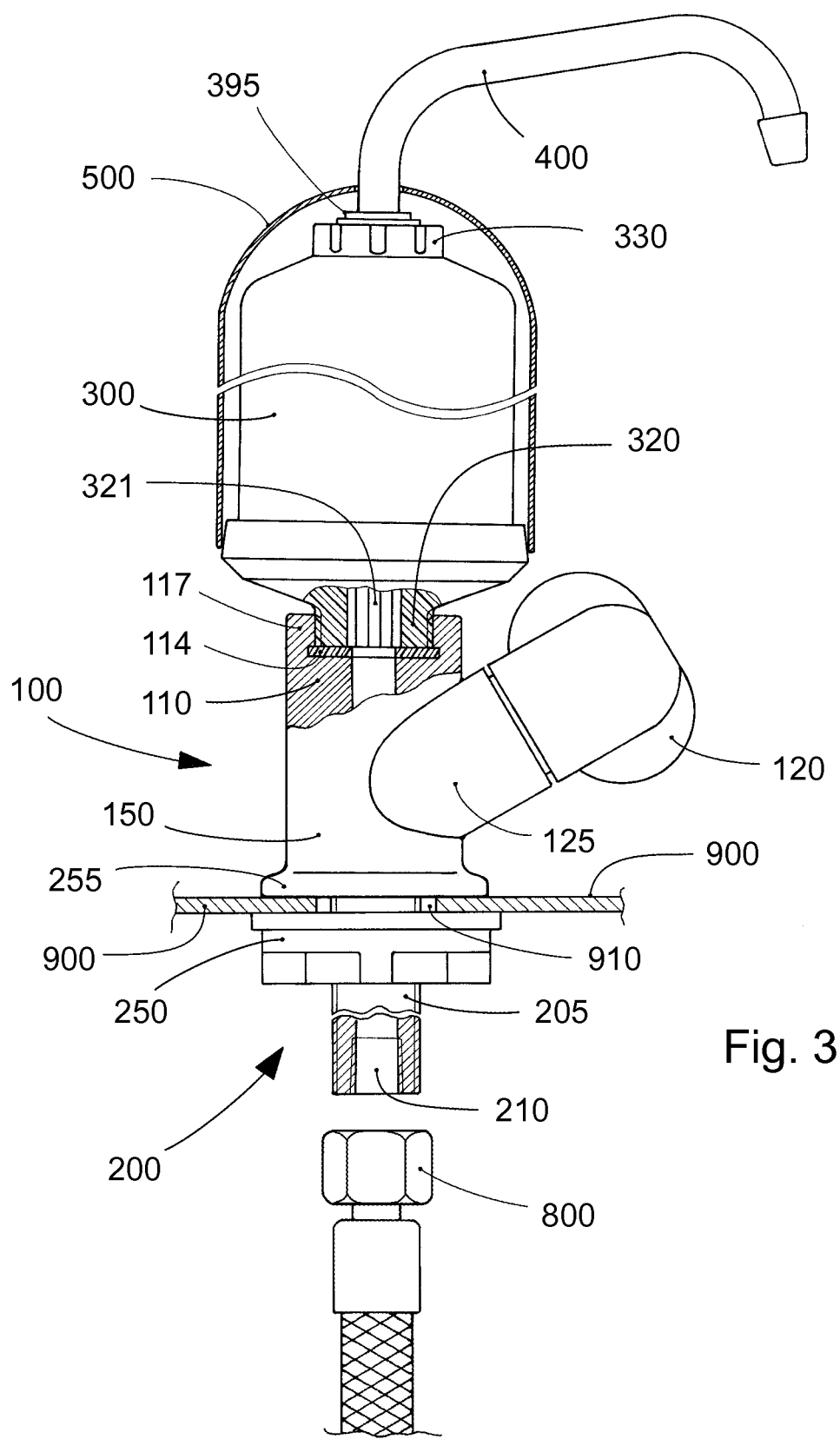
FIG. 3 is an elevation view partially in section of an alternative embodiment of the filter faucet, according to the invention.

In FIGS. 1 and 2, the valve assembly 100 is shown mounted on a sink or similar countertop mounting surface 900 generally similar to a countertop faucet assembly. The valve assembly 100 is conjoined with a combined means 200 extended downward and operatively fitted through a hole 910 in the mounting surface 900. The combined means 200 operatively fastens the valve assembly 100 to the mounting surface 900 and couples with a potable cold water supply conduit 800, shown in FIG. 3. The combined means 200 is shown comprising a mounting support 255, an externally threaded pipe 205 alternatively known as a faucet shank, and a fastening means 250 in the form of a threaded nut externally shaped for easy gripping. The mounting support 255 is operatively positioned on top the mounting surface 900 for supporting and optionally for fastening the valve assembly 100 to the top of the mounting surface 900. The mounting support 255 may alternatively be a discrete element (FIGS. 1 and 4) or an incorporated portion of the valve assembly 100 (FIGS. 2 and 3). The externally threaded pipe 205 extends downward to cooperate with the internally threaded fastening nut 250 for securely fastening the valve assembly 100 to the mounting surface 900. The end of the threaded pipe 205 has a water supply connection means 210 for a fluid connection with a potable cold water supply conduit 800 and providing a fluid passage to the valve assembly 100. The water supply connection means 210 is shown possessing an internally threaded fitting and may equally use the external threads to form a water supply connection.

The valve assembly 100 is shown having a flow control means 120 operable in an open position for permitting water flow through the control valve 125 and in a closed position for blocking the water flow. The means 120 being shown as a manually operated handle for operating the valve and controlling the water flow. The flow control means 120 may be implemented in any number of ways known in the art for actuating a valve, including for example a pneumatically operated foot pedal or an electronic infrared sensing device and solenoid for operating the control valve 125 without manual manipulation (not shown). The valve assembly has a water outlet 110 comprising an externally threaded pipe stub 118 and a sealing surface 119. The threaded pipe stub 118 and the sealing surface 119 of the water outlet 110 being a point of engagement with the disposable inline filter 300.

The disposable inline water filter 300 is generally of the type provided by the Omnipure CL-series and K-series filters. This type of filter has a watertight shell 310 typically of plastic material comprising an axially tubular construction and enclosing water treatment media 315.

The watertight shell 310 comprises a water inflow port 320 and a water outflow port 330 in general coaxial alignment. The inline water filter 300 is improved for new use in conjunction with the valve assembly 100 in that the water inflow port 320 comprises a fitting 325 and a contact surface 323. The filter inflow port fitting 325 provides for the filter to removably couple with the water outlet 110 of the valve assembly 100 for a fluid tight connection. The filter inflow port fitting 325 is shown in the form of internal threads corresponding with the externally threaded pipe stub 118 of the valve assembly 100. The filter inflow port contact surface 323 meets and compresses together with the sealing surface 119 of the valve assembly water outlet 110. The filter inflow port contact surface 323 may be self-sealing. For example, the contact surface 323 may comprise a flat sealing surface or an optional integrally raised portion 324 about the inflow port opening 325. The plastic material of the filter shell 310, for example polypropylene, has enough resilience for compressive sealing with the valve outlet sealing surface 119. Alternative forms of fluid sealing known in the art may be used, examples being self-sealing threads and an elastomer o-ring or gasket (not shown).

The water outflow port 330 of the disposable inline water filter 300 is shown comprising a fitting 335 configured for receiving the inlet end 410 of the water spout 400. The filter outflow fitting 335 is shown having a smooth inner generally cylindrical wall pre-sized to fit the spout inlet end 410, an inner abutment 336 for supporting the spout inlet end 410, and a flared opening for easier insertion of the spout inlet end 410. The abutment 336 is also useful for limiting the depth of insertion of the water spout 400. The spout 400 has a tubular configuration shaped for discharging the treated water. The spout inlet end 410 includes a sealing means 420 for a corresponding watertight connection with the filter outflow port fitting 335. The spout sealing means 420 is shown in the form of dual elastomer o-rings for maintaining a watertight seal while allowing swivable movement and positioning of the spout 400. The corresponding watertight connection between the spout inlet 410 and the filter outflow port fitting 335 may have numerous alternative forms as described in later example embodiments.

FIG. 2 shows a valve assembly 100 diverging from the vertical configuration of FIG. 1. FIG. 2 shows the valve assembly laterally offsetting the valve water outlet 110 and associated fitting 118 to show a variation in faucet design. The advantage of this faucet assembly 100 being the decreased vertical height of the complete water filter faucet assembly. The disadvantage being the increased size of the footprint on the mounting surface 900.

Figure 4:
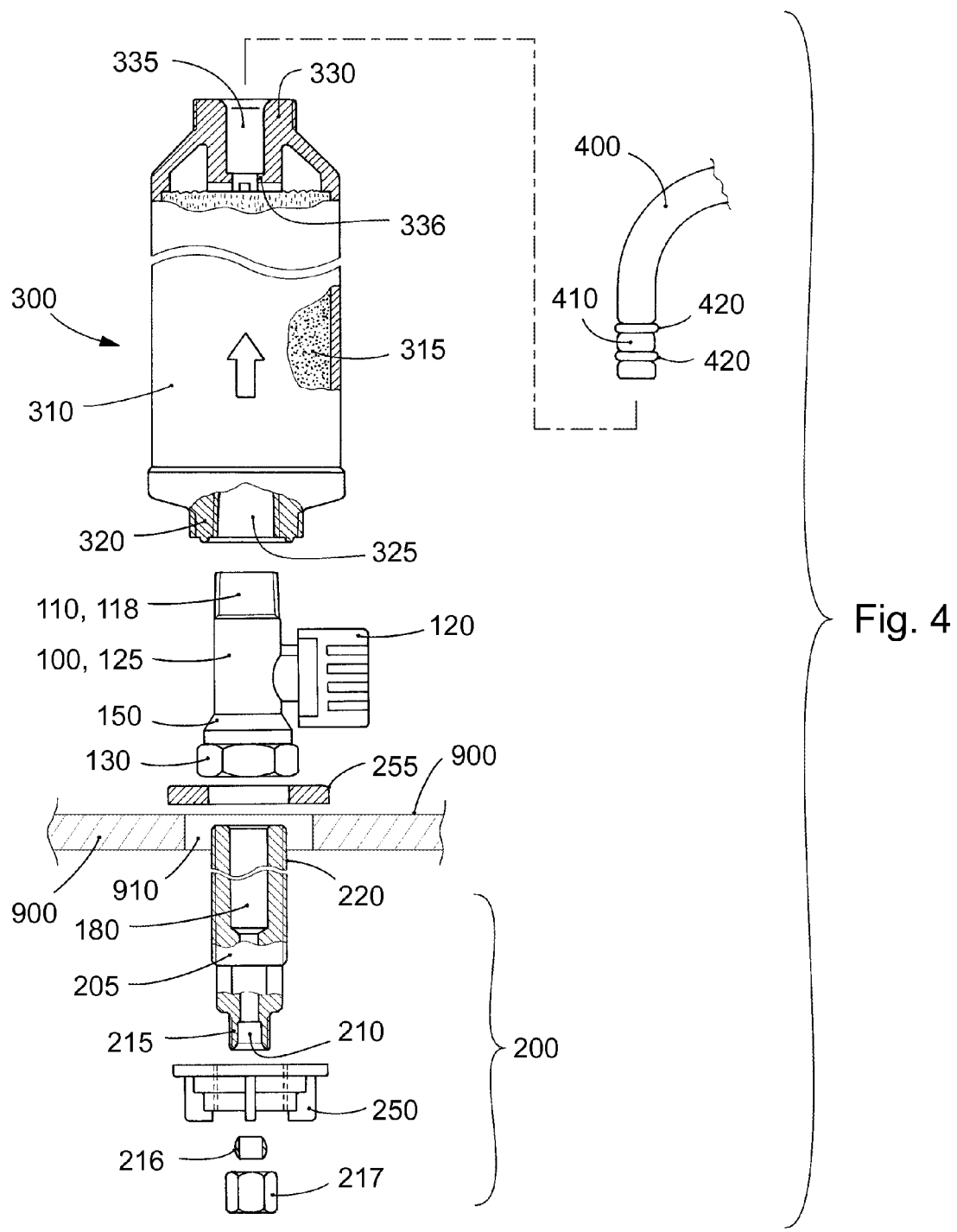
FIG. 4 is an exploded view showing a further alternative embodiment of the filter faucet, according to the invention.

FIGS. 3 and 4 illustrate alternative water treatment assemblies generally in the form of a filter faucet. The water treatment assemblies comprise a faucet assembly 100, a combined means 200, a disposable inline water filter 300, and a faucet spout 400.

In both FIGS. 3 and 4, the faucet assembly 100 comprises the combined means generally indicated by 200, a water flow control valve 125, and a fluid outlet fitting means 117, 118 respectively, for a water outlet 110 and for engagement with the inline water filter 300. The combined means 200 conjoins a means for fastening to a mounting surface 900 with a means 210 for fluidly coupling to a cold water supply conduit 800. The means for fastening to a mounting surface 900 is shown as the operative combination of a mounting support 255, an externally threaded pipe 205 extending down through an opening 910 in the mounting surface 900, and a fastening means 250. The weight of the complete water treatment assembly and the tightening force from the fastening nut 250 are supported by the mounting support 255 upon the mounting surface 900. The water control valve 125 comprises a body 150 supported on the mounting support 255. The water control valve is positioned fluidly intermediate the means 210 for fluidly coupling with a cold water supply conduit 800 and the water outlet 110 of the faucet assembly 100. A valve handle 120 is provided for manual actuation of the valve 125.

FIG. 3 depicts in full assembly, the water filter faucet with the water flow control valve 125 and valve body 150 having a lowermost portion contiguous to the top portion of the mounting surface 900. This lowermost portion of the valve body 150 is the mounting support 255 for supporting the faucet assembly 100 on the countertop 900. An intermediate sealing means (not shown) may be optionally placed between the mounting support 255 and the countertop 900. The fastening means 250 is in the form of an internally threaded nut for fastening in cooperation with the externally threaded pipe 205 and mounting support 255.

FIG. 3 further depicts in section, a threaded compression connection between the filter inflow port 320 and the faucet assembly water outlet 110. The faucet assembly water outlet 110 is shown having a female socket fitting 117 with internal threads and a sealing means 114 in the form of an elastomer gasket or washer for cooperative sealing engagement with the filter outflow port 320. The connection between the water outlet 110 and the filter inflow port 320 may be in other cooperative forms providing watertight engagement; for example a bayonet fitting similar to that taught in U.S. Pat. No. 3,760,951. A decorative cap 500 may be placed over the filter 300.

The filter inflow port 320 has an internally grooved surface 321 for gripping during the spin-weld manufacturing process. The filter water outflow port 330 is shown having a push-to-connect tube fitting 395, in which the water spout 400 is inserted. This push-to-connect tube fitting is shown and described in FIG. 9.

In FIG. 4 the combined means 200 is shown in more detail, comprising the externally threaded pipe 205, the fastening means 250, and the water supply connection means 210. The water supply connection means 210 is shown as a compression tube fitting 215 having a ferrule 216 and a compression nut 217. The water supply connection means may be in other forms for the common purpose of attaching to a water supply conduit 800, as shown in FIG. 3.

The water flow control valve 125 is shown as an improved straight pattern stop valve having a water inlet 130 with FIP threads and an adapted water outlet 110 with MIP threads. The improved valve outlet 110 preferably has ⅜ inch MIP threads for engaging the ⅜ inch FIP threaded inflow port 325 typically provided with the Omnipure CL-series filter. The valve is supported on the countertop 900 by the support means 255.

The support means 255 is shown in the form of a simple flat washer or rigid escutcheon able to bear the weight of the complete water treatment assembly and the compressive force from being fastened to the mounting surface 900. The importance of the washer or escutcheon is made apparent when the mounting hole 910 is larger in diameter than the valve water inlet structure 130, without which the valve may otherwise slip through the mounting hole 910. The relative dimension of the mounting support 255 requiring an outer diameter larger than the mounting hole 910 and an inner diameter smaller than the valve water inlet 130.

The externally threaded pipe 205 of the combined means 200 is shown with an end fitting 220 for a corresponding fluid connection with the valve water inlet 130. In assembly, a fluid passage is formed from the water supply connection means 210, through the inner fluid passageway 180 of the threaded pipe 205, through the water flow control valve 125, through the inline water filter 300, for discharge from the spout 400.

Figure 5:
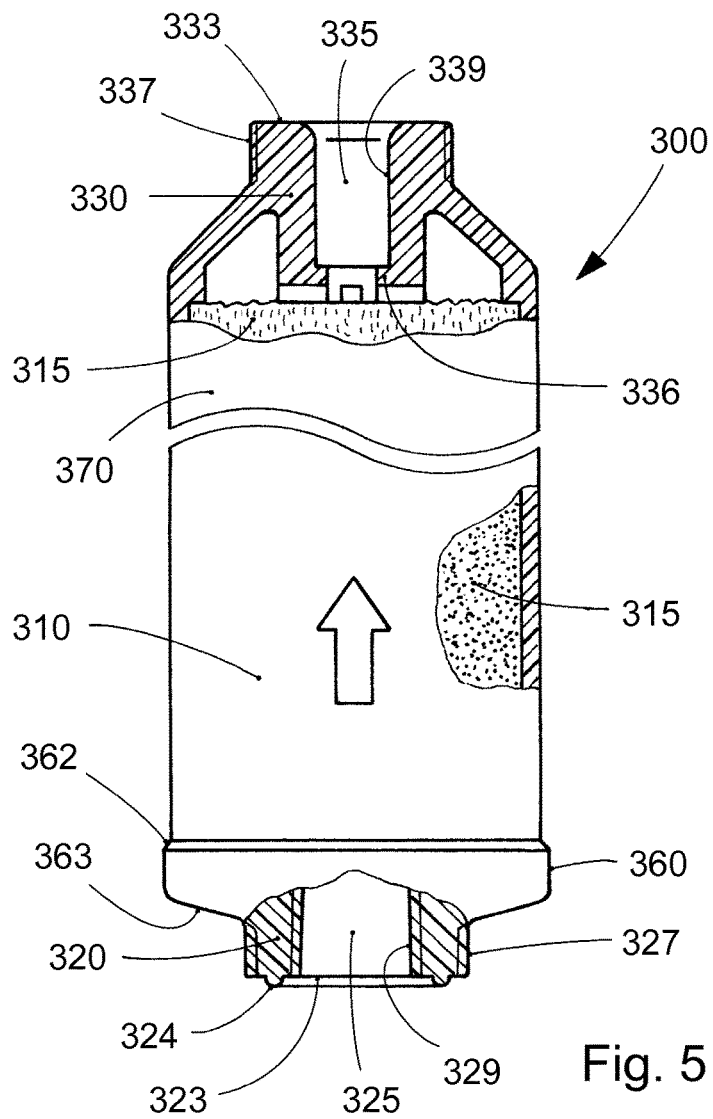
FIG. 5 is an elevation view partially in section of an inline water filter configured for new use as a cartridge for a filter faucet, according to the invention.

In accordance with the invention, the embodiment depicted in FIG. 5 illustrates an improved inline water filter suited for new use as a modular filter cartridge for a filter faucet or the like. The improved inline water filter generally indicated at 300 essentially comprises an impermeable and watertight axially-aligned tubular shell 310 having an inflow end 360 and an outflow end 370. The filter shell is shown being formed of two molded plastic parts enclosing water treatment media 315 and being spin-welded together forming a shoulder 362 during the manufacturing process. The inflow end 360 of the filter shell 310 comprises a water inflow port 320 and the outflow portion 370 comprises a water outflow port 330. The water inflow port 320 and water outflow port 330 are generally coaxially and oppositely arranged.

Figure 7:
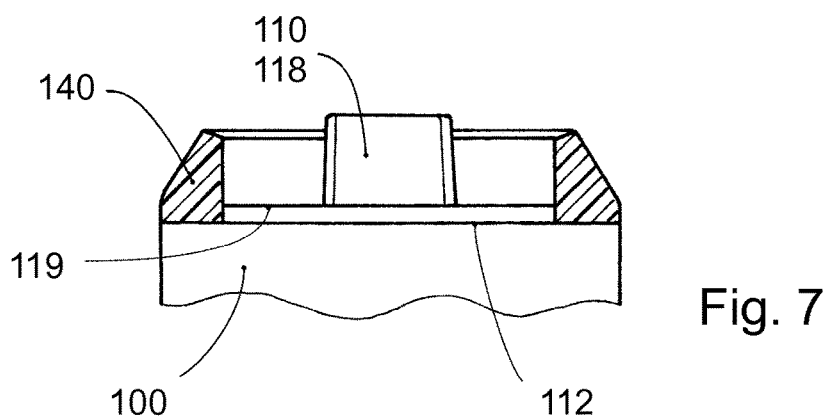
FIG. 7 illustrates in elevation view, a broken away portion of a faucet outlet configured to engage the inflow end of the inline water filter of FIG. 5.

The inflow end 360 of the inline filter 300 is generally designed for fluidly engaging the outlet 110 of a faucet assembly 100 shown in fragmentary view in FIG. 7. To enable this cooperative watertight connection, the filter inflow port 320 includes a fitting 325 having internal threads 329 and optional external threads 327 as shown and described in FIG. 3, and an optional contact surface 323 with an optional sealing means 324 shown in the form of an integrally raised portion about the inflow port opening 325. As described for FIG. 1, the filter inflow contact surface 323 may be self-sealing or may comprise other sealing means known in the art; for example a resilient o-ring residing in an annular groove.

FIG. 7 in fragmentary view, depicts the preferred form of the outlet 110 of the faucet assembly 100. The outlet is shown comprising a pipe stub 118 having external threads, a sealing surface 119, and a spacer 140. The sealing surface 119 may be any of numerous types of appropriate sealing means available in the art; for example a resilient gasket or even a smooth machined face for compressing the resilient plastic material of the filter contact surface 323. During operational engagement, the internal threads 329 of the filter inflow fitting 325 are screwed onto the valve assembly outlet fitting 118. The filter inflow port contact surface 323 meets and seals with the valve assembly sealing surface 119. The spacer 140 shown in section, may optionally provide lateral support for the broader end cap surface 363 of the filter inflow end 360.

Figure 6:
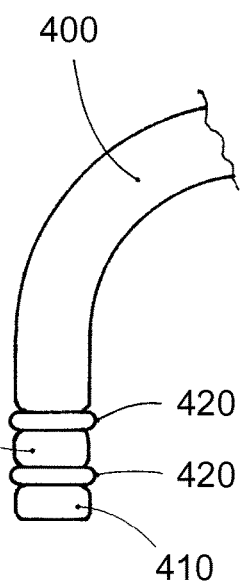
FIG. 6 illustrates in plan view, a broken away portion of a water spout, which may be removably inserted in the socket fitting of the outflow port of the inline water filter of FIG. 5.

Returning to FIG. 5, the filter outflow portion 370 is shown comprising an outflow port 330 for receiving the inlet end 410 of a water spout 400 shown in FIG. 6. The filter outflow port 330 is shown comprising a socket fitting 335 having an abutment 336, a generally cylindrical sealing surface having the form of a smooth internal wall 339, a contact surface 333, and an outflow port external surface 337 optionally comprising slots or threads as shown and described in FIG. 10. The cylindrical socket fitting 335 may preferably be configured with a slightly flared entry for easier insertion of the spout inlet end 410.

The water spout 400 of FIG. 6 shown in fragmentary view, comprises a generally tubular inlet end 410 having a smooth cylindrical outer contact surface 415, and a sealing means 420 shown in the form of dual o-rings. The spout inlet end 410 is to be slidably inserted into the socket fitting 335 of the filter outflow port 330 in FIG. 5. The spout sealing means 420 resiliently compresses and forms a watertight seal in conjunction with the socket sealing surface 339. The socket fitting 335 inner abutment 336 limits the depth in which the spout inlet end 410 may be inserted while also supporting the spout 400 during use. The surface friction of the spout sealing means 420 compressed between the socket fitting sealing surface 339 and the spout inlet end 410 keeps the spout 400 in place, preventing water flow from pushing the spout inlet end 410 out of the socket fitting 335. In another combination, the spout inlet end 410 may include rolled protruding annular rings (not shown) on the outer surface 415 for press fitting into the socket fitting 335. In both examples, the water spout 400 is swivably and releasably engaged with the filter outflow port 330.

Figure 8:
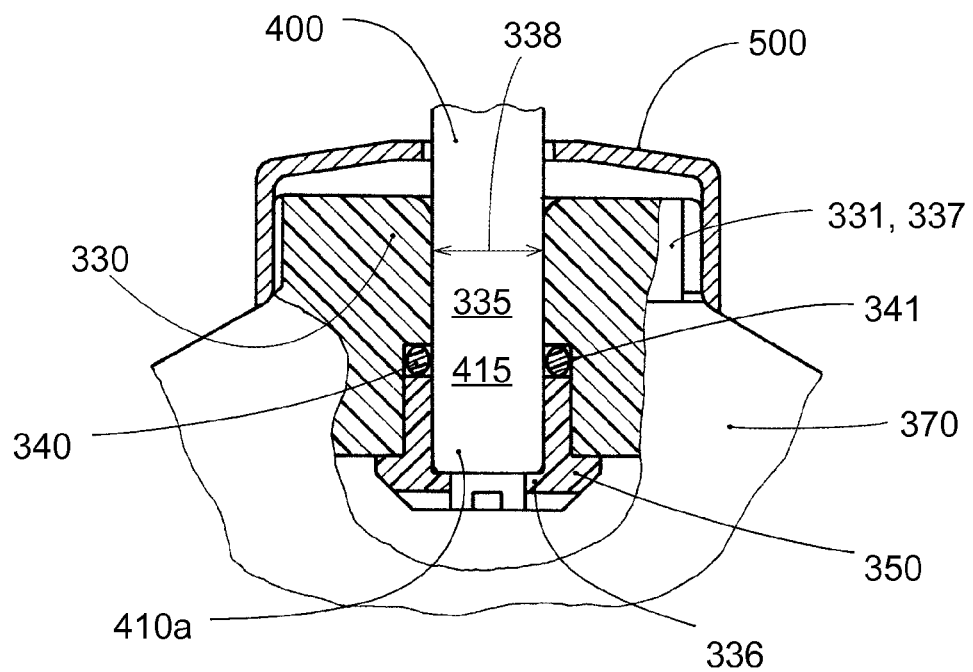
FIG. 8 is a broken away outflow end portion of an inline water filter, fragmentary in section, showing an alternative outflow port structure capable of receiving a tubular water spout having a smooth inlet portion.

The disposable inline water filter outflow portion 370 may have further numerous alternative embodiments. FIG. 8 embodies an outflow portion 370 that may be incorporated in the inline water filter 300 according to the invention. The outflow portion 370 shown partially in section, is configured as having an outflow port 330. The outflow port 330 forms a socket fitting 335 including an axially aligned substantially cylindrical bore 338 comprising an outer portion having a smaller diameter and an inner portion having a larger diameter (not indicated). An inner bushing 350 is fit within the bore inner portion in a manner creating an annular channel 341 between the bushing 350 and the bore 338 outer portion. An annular sealing ring 340 is disposed within the annular channel 341 for sealingly and frictionally engaging the faucet spout tubular inlet end 410*a* having a generally smooth outer sealing surface 415 as shown best in FIG. 10. The inner bushing 350 has an axially centered hole (not indicated) to permit water flow and provides an inner abutment 336 for supporting and limiting insertion of the spout inlet end 410*a*. Alternatively, the annular channel 341 for a sealing means 340 may be directly machined in the bore 338, and the bore may be ended with a shoulder 336 for limiting the depth to which the spout inlet end 410*a* may be inserted into the socket, without need for a separate inner bushing 350. For aesthetic purposes, the outflow portion 337 may include a decorative cap 500 that covers the externally gripped surface 337 of the outflow port 330 annular protrusion 331. The gripped external surface 337 may serve to facilitate the spin-weld assembly process of the inline water filter 300.

Figure 9:
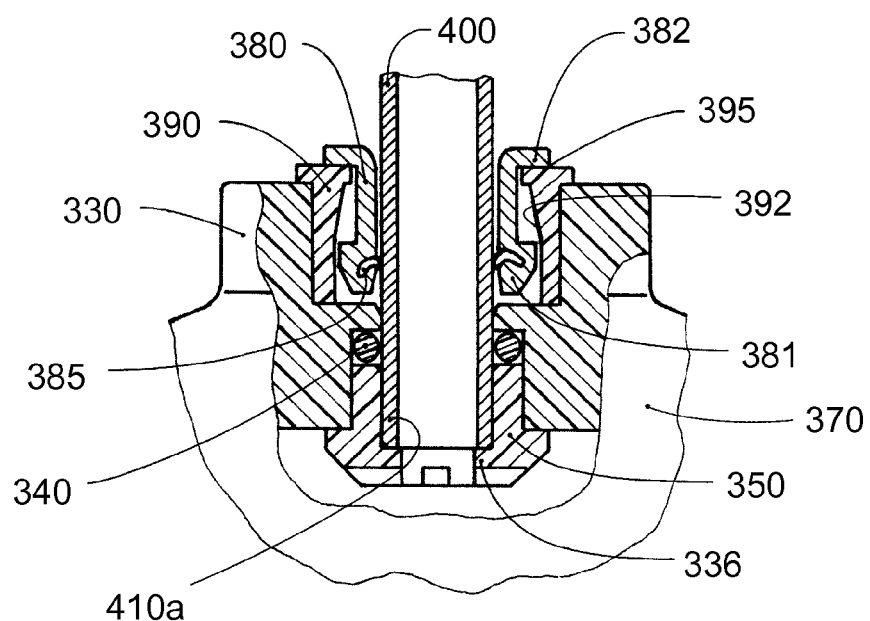
FIG. 9 is a broken away outflow end portion of an inline water filter, fragmentary in section, showing an alternative outflow port structure capable of receiving a tubular water spout having a smooth inlet portion.

FIG. 9 depicts an alternative outflow portion 370 fragmentary in section, that may be incorporated in the inline water filter according to the invention. The outflow portion 370 is generally similar to the structure of FIG. 8 except that FIG. 9 further comprises a tube locking mechanism 395 for locking the spout tubular inlet end 410*a* in the socket. This type of tube locking mechanism 395 is commonly known as a push-in, push-to-connect, and quick-connect tube fitting. The socket fitting is shown incorporating a collet 380 having resilient arms 381 arranged to cooperate with a cam surface 392 of the surrounding bushing 390. The cam surface 392 tapers in the axial direction such that as the spout inlet end 410*a* is pulled outward, the frictional engagement between the spout inlet end 410*a* and the collet 380 pulls the collet outward from the fitting. As the collet 380 is pulled outward, the resilient arm 381 of the collet slides along the inner cam surface 392 of the bushing 390 with inward radial movement, increasing the frictional force of the collet arms 381 against the spout inlet tube 410*a*. The tightened grip of the collet 380 firmly holds the tubular spout inlet end 410*a* in place. The spout inlet end 410*a* may be withdrawn by pushing the collet flange shoulder 382 inward into the socket, thereby allowing the arms 381 to move radially outward, resulting in decreased frictional force against the spout inlet cylindrical surface 415, allowing the spout tube to be withdrawn. The locking ability of the collet 380 may be optionally enhanced by embedding a gripping element 385 or teeth into the collet arms 381. For a spout inlet end 410*a* with a metallic or chromed surface, it is preferable for the collet arms 381 to be provided without any sharp metal projections 385 or teeth, which may cut into and damage the external sealing surface 415 of the spout inlet end 410*a*. The sharp gripping teeth 385 work well if the spout 400 is made of plastic tubing material as a disposable spout. The outflow port 330 may have other similar socket fitting structures for example as described in U.S. Pat. Nos. 4,005,883, 4,606, 783, and several others. U.S. Pat. No. 4,606,783 provides a threaded adapter having a socket fitting comprising a collet locking mechanism that may be fit into the filter outflow port 330. The quick-connect fitting has an internal socket diameter just sufficient to accommodate the inlet end 410*a* of a spout of predetermined external diameter, preferably ⅜ inch, slidably inserted therein.

Figure 10:
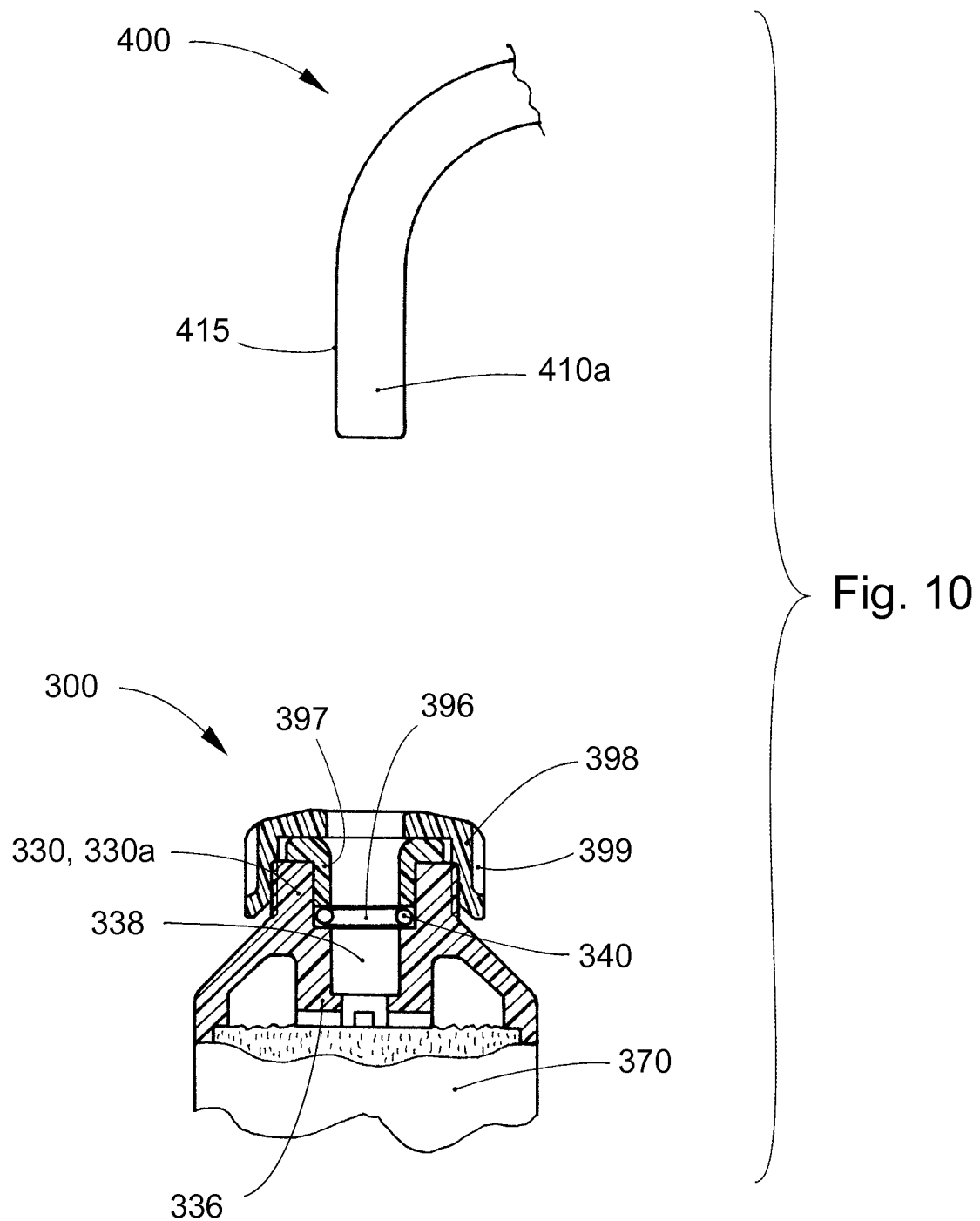
FIG. 10 is an exploded view of the outflow end portion of an inline water filter, fragmentary in section, showing an alternative outflow port structure and the corresponding smooth inlet portion of a spout.

FIG. 10 embodies a further example of an alternative filter outflow portion 370, according to the invention. In this fragmentary embodiment shown partially in section, the outflow port 330 is configured having a cylindrical stepped bore opening 338 with an outer portion having an increased diameter at the top, and an inner portion having a decreased diameter at the bottom. The first step disposed at the bottom defines an abutment 336 limiting the insertion depth of the tubular spout inlet end 410a inserted therein. The second step intermediate the socket defines a bottom support for a sealing ring 340. The outflow port 330 further includes a locking bushing 397 or packing sleeve having an outwardly extending flange shoulder resting on the outflow port annular portion 330a. The bushing 397 encloses and supports the sealing ring 340 from the top. The annular portion 330a has external fastening threads and includes a threadably engaged compression nut 398 securing the bushing 397 and sealing ring 340 in the cylindrical bore 338. This alternative socket fitting is suitable for engagement with a faucet spout 400 shown in portion, having a tubular smooth outer surface 415. The compression nut 398 may have an outer digitally engaging surface suitable for hand tightening for regulating the compression connection between the outflow portion 370 and the spout inlet end 410a.

Figure 11:
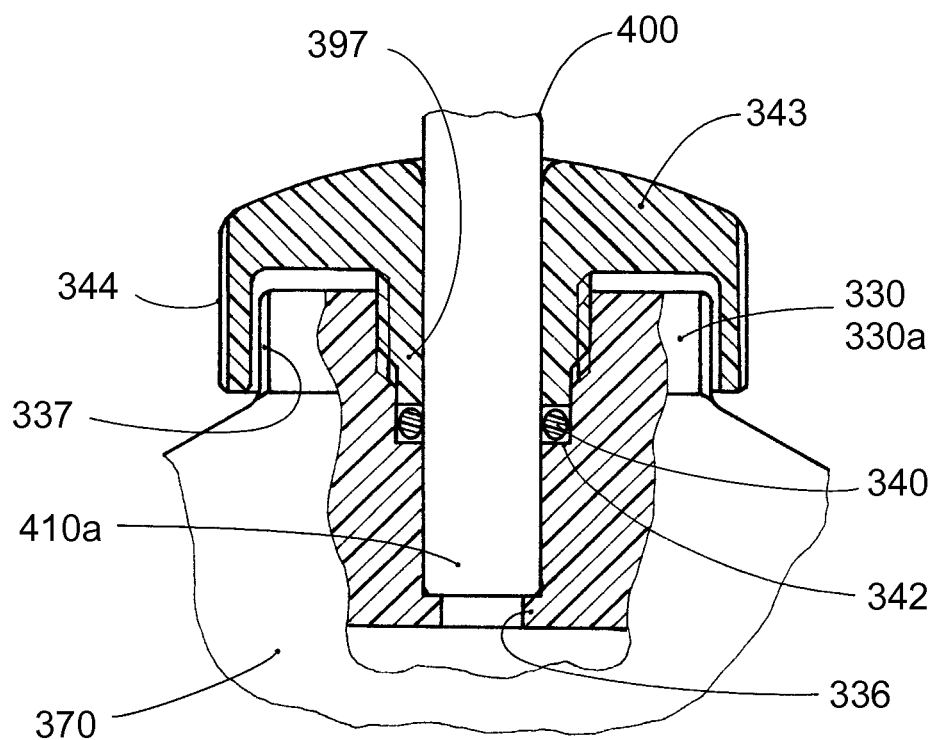
FIG. 11 is a broken away outflow end portion of an inline water filter, fragmentary in section, showing a further alternative outflow port structure corresponding with a smooth tubular spout inlet portion.

FIG. 11 illustrates a further alternative outflow portion 370, according to the invention. The outflow portion 370 shown partially in section, includes an outflow port 330 with an axially-aligned opening partially threaded, a sealing support shoulder 342 for a sealing ring 340, and a lower shoulder 336 to form a stop for the tubular inlet end 410a of an inserted spout 400. The structure includes a hollowed packing nut 343 having an integrated packing bushing 397 with external threads and an axially-centered opening. The integrated externally threaded bushing 397 is for threadably engaging with the partially threaded opening of the outflow port 330. The threaded engagement allows to regulate the tightness with which the sealing ring 340 frictionally holds the inlet end 410a of the spout 400 in place. The packing nut 343 may be molded from a plastic material and may further have an outer surface 344 configured to allow hand gripping for tightening the nut and compressing the sealing ring to firmly hold the spout inlet end 410a. The spout inlet end 410a is held in place with the lower shoulder 336 and compressed ring 340.

Figure 12:
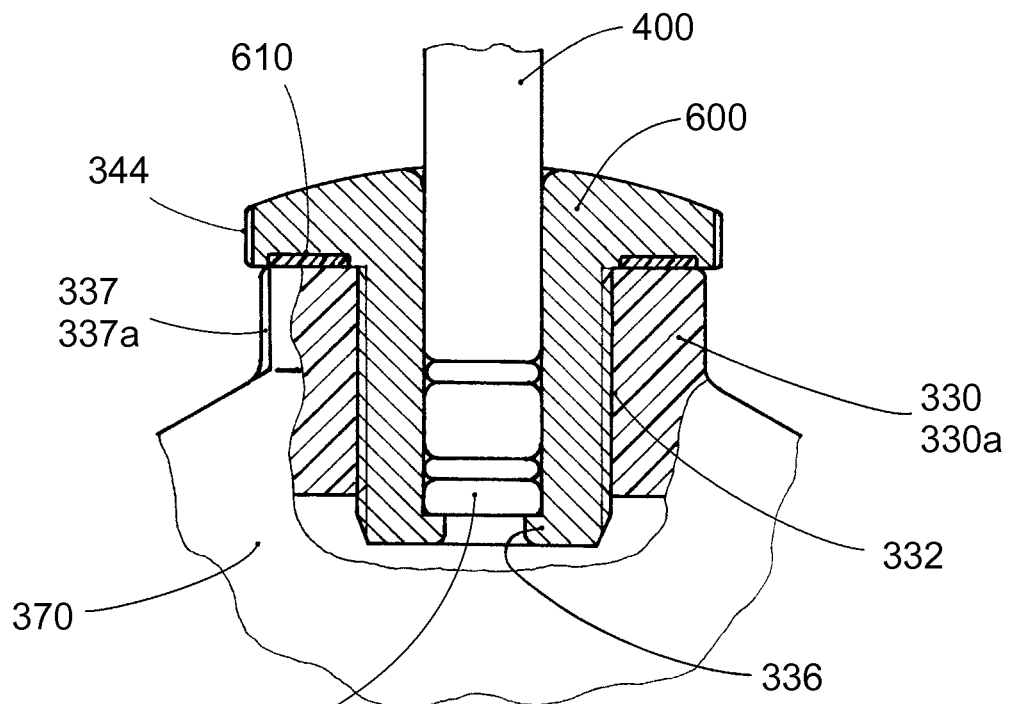
FIG. 12 is a broken away outflow end portion of an inline water filter, fragmentary in section, showing an alternative outflow port structure in which an adapter is fit for engagement with a water spout inlet end provided with sealing rings.

FIG. 12 depicts a further alternative outflow portion 370 partially in section, wherein an adapter 600 is fit to the outflow port 330 for engagement with the spout tubular inlet end 410. The embodiment may be incorporated in the improved inline water filter for use as a cartridge according to the invention. The outflow portion having a female threaded pipe fitting 332 includes a threaded cap adapter 600 for converting the threaded fitting into an opening suitable for receiving the inlet end 410 of a spout 400 of the type as shown in FIG. 6. The adapter 600 being preferably molded from plastic, is configured for threaded and sealing engagement with the existing threaded fitting 332, and for sealingly and releasably engaging the spout inlet end 410. The adapter 600 includes a socket fitting being identical to the socket fitting 335 shown and described in the section related to FIG. 5. To establish a watertight connection, a plumbing thread sealant may be used or a sealing member 610 may be provided. The filter outflow annular portion 330a may include vertically arranged multiple grooves or projections 337a on its cylindrical external surface 337. The multiple projections and/or grooves 337a facilitate gripping during the spin-weld assembly process of the inline water filter shell.

Figure 13:
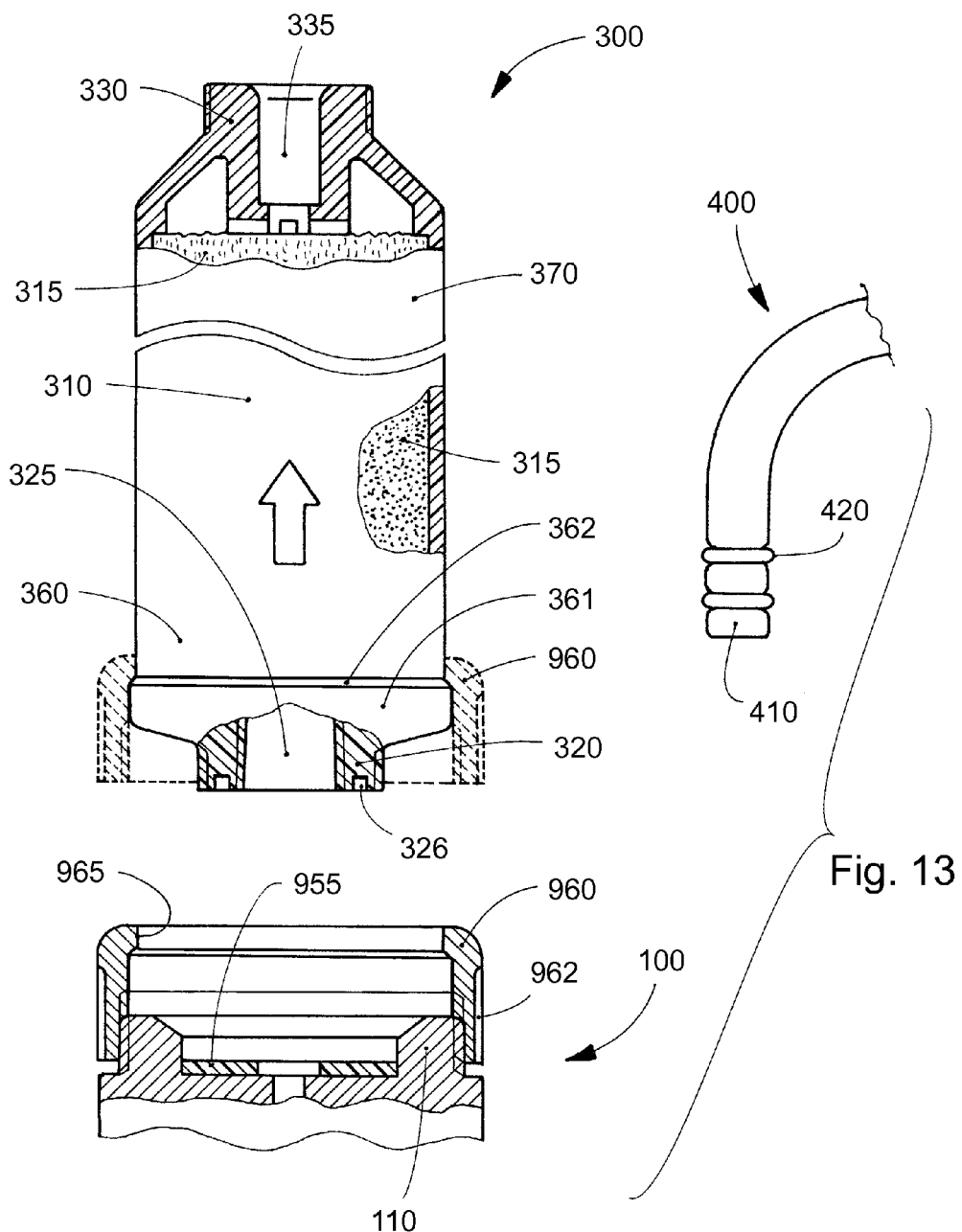
FIG. 13 is an exploded plan view, partially in section, of an inline water filter and a corresponding faucet water outlet adapted for a removable compression connection.

FIG. 13 illustrates how a disposable inline water filter may be connected to a faucet assembly 100 having an alternative water outlet 110 comprising a compression socket fitting. Generally, the bottom portion of an inline water filter includes a shoulder 362, which is a portion of the shell end cap 361 as a result of the spin-weld manufacturing process. The shoulder 362 may be used for fastening the inline water filter to the faucet assembly 100. The water outlet 110 is shown being adapted for receiving the inline water filter 300. The water outlet 110 shown partially in section, includes a socket fitting comprising a compression nut 960 provided with an inner force flange 965 for securing the above arranged inline filter 300 in the socket. The compression nut 960 is depicted in two positions; as attached to the water outlet 110 with solid lines, and attached to the inline filter 300 with broken lines. The socket portion of the water outlet 110 may include a sealing gasket 955 to facilitate watertight connection between the water outlet 110 and the inline water filter 300. The compression nut 960 is provided with an outer digitally engaging surface 962 to facilitate hand threaded attachment. The contact surface of the filter inflow port 320 is shown having an optional annular groove 326 for receiving an elastomer sealing o-ring.

Figure 14:
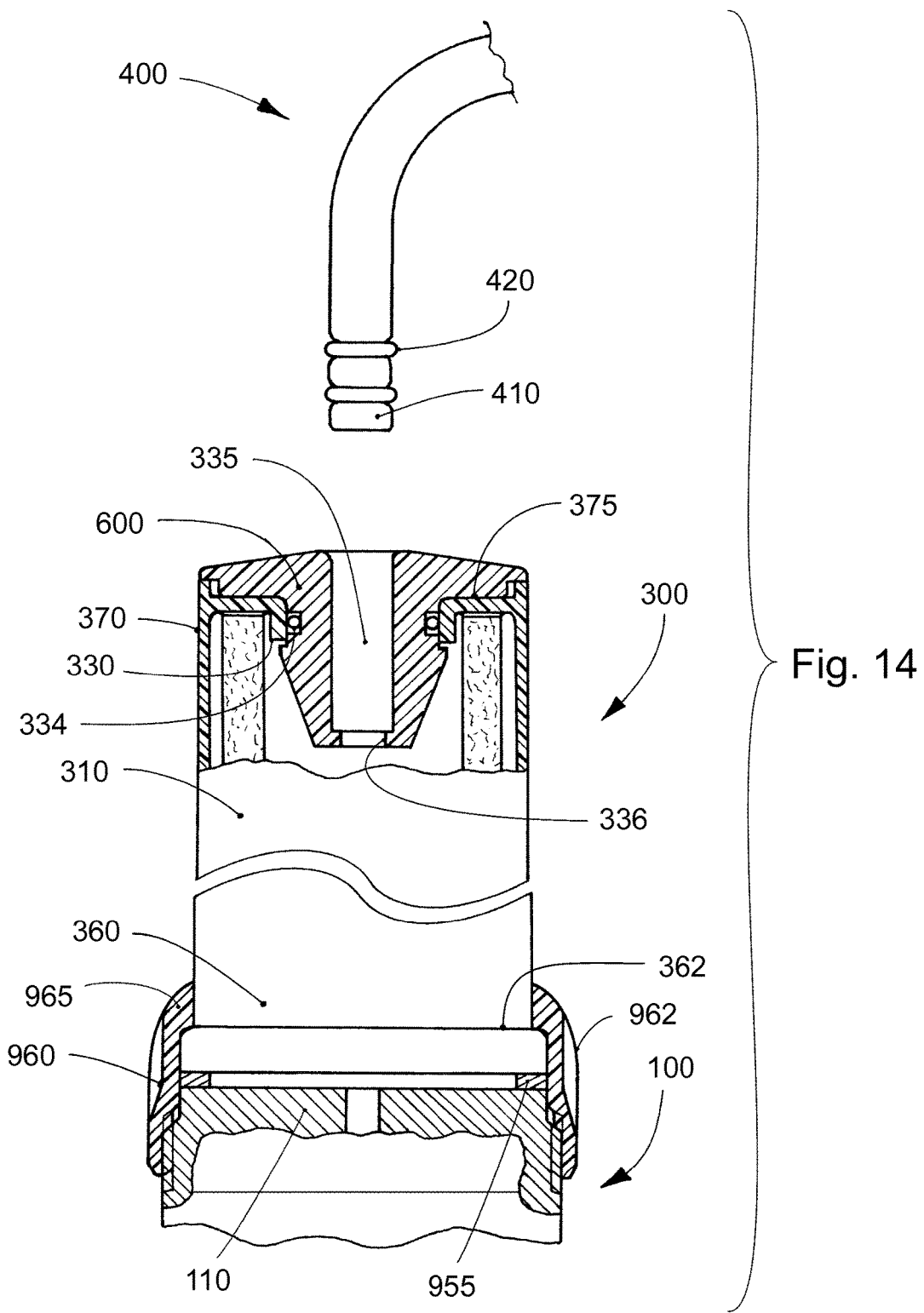
FIG. 14 illustrates an elevation view, fragmentary in section, of an alternative inline water filter adapted for new use as a cartridge for a water treatment assembly.

FIG. 14 illustrates an alternative style of inline water filter of the type provided by OmniFilter model GAC1-SS. This style of inline water filter 300 is provided with an inflow end 360 and an outflow end 370 shown partially in section. The inflow end 360 has a shoulder 362 shown coupled with a faucet assembly water outlet 110. A compression nut 960 shown in section, connects the filter inflow end 360 to the water outlet 110 being sealed by an intermediate sealing gasket 955. The filter outflow end 370 is shown with an inventive push-in adapter 600 inserted into the outflow port 330 and resting upon the top flat surface 375. The inventive adapter 600 shown in section, comprises a sealing means 334 shown in the form of an elastomer o-ring for sealing between the filter outflow port 330 and the adapter 600. The inventive adapter 600 has a socket fitting 335 for sealingly receiving the inlet end 410 of the spout 400, being supported by the abutment 336 and sealed by the spout sealing means 420 shown in the form of dual elastomer o-rings.

Figure 15:
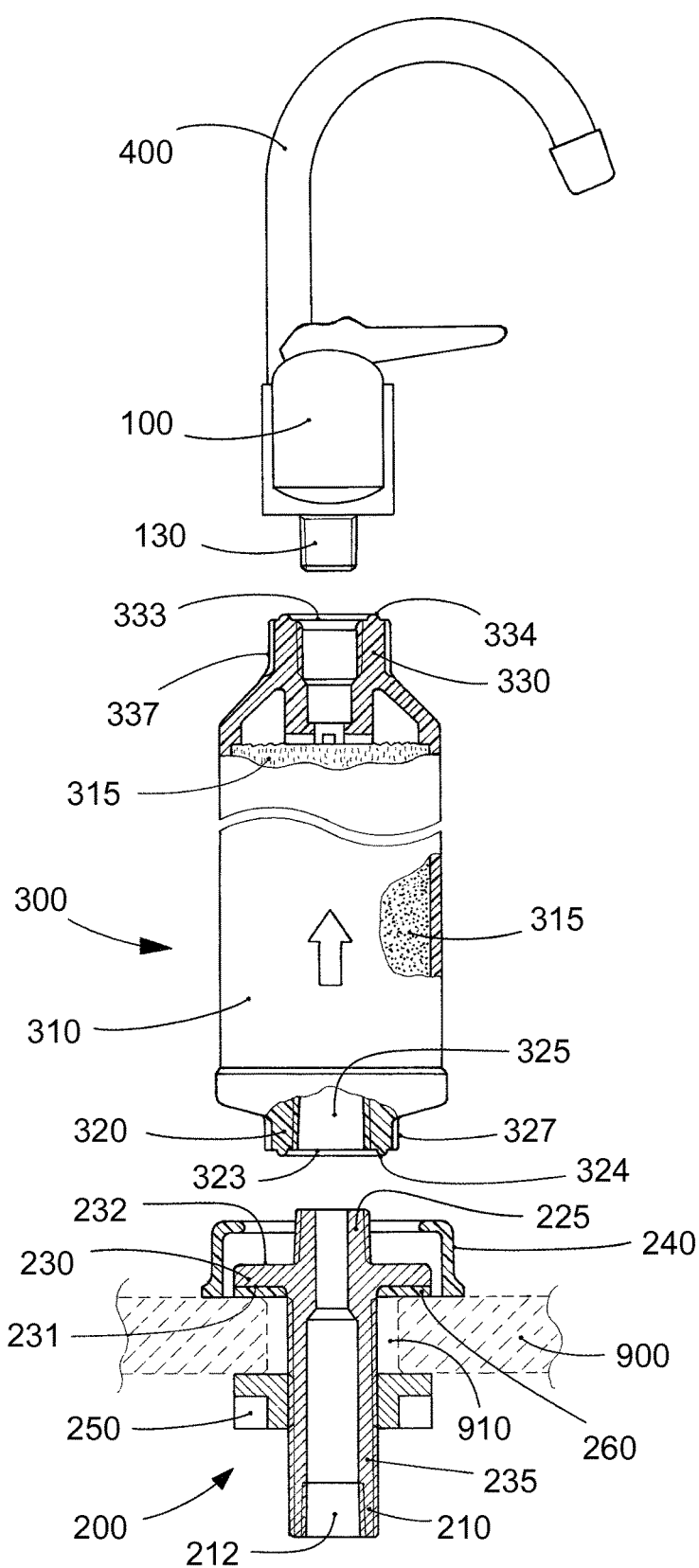
FIG. 15 illustrates in an exploded view a further alternative embodiment of the filter faucet, according to the invention.

FIG. 15 illustrates in exploded view, an alternative embodiment showing a varied combination of the components used to construct a countertop filter faucet. This countertop filter faucet comprises a combined means 200, an inline water filter 300, a valve assembly 100, and a faucet spout 400.

The combined means 200 shown in section, conjoins a means for fastening to a mounting surface 900 with a means 210 for fluidly coupling to a water supply conduit. The means for fastening to a mounting surface comprises combines several components together. An externally threaded pipe 235 extends through a mounting hole 910 in the mounting surface 900. A force flange 230 having a lower surface 231 and an upper surface 232 is joined with the threaded pipe and resting upon the mounting surface 900. A washer 260 is positioned intermediate the force flange lower surface 231. A fastening means 250 in the form of an internally threaded nut having an external gripping surface is fastened to the threaded pipe 235 on the underside of the mounting surface 900. The means 210 for fluidly coupling to a water supply conduit comprises an internally threaded fitting 212 on the lower end of the threaded pipe 235. An escutcheon 240 may be provided as a cover for the combined means 200. A water outlet portion 225 atop the force flange 230 is in the form of an externally threaded pipe stub. The water outlet portion 225 is for fluid engagement with the filter inflow port 320.

The inline water filter 300 shown partially in elevation view and partially in section, is the same type of inline filter previously described having a watertight shell 310 enclosing filter media 315, an inflow port 320, and an outflow port 330. The filter inflow port 320 has an internally threaded fitting 325 for corresponding connection with the combined means 200 water outlet portion 225. A contact surface 323 having a self-sealing means 324 in the form of an integrally raised annular portion is for compressive and resilient sealing against the force flange upper surface 232. The outer surface 327 of the inflow port 320 may be provided with grooves for gripping during the spin-weld manufacturing process of the filter shell 310.

The valve assembly 100 and the spout 400 shown in elevation view, are conjoined to generally create a faucet assembly. The valve assembly has a water inlet 130 shown in the form of an externally threaded pipe stub for fluid engagement with the inline filter 300 outflow port 330.

The inline filter 300 outflow port 330 is correspondingly configured for a fluid connection with the valve assembly 100 water inlet 130. The outflow port 330 has a contact surface 333 shown with an integrally raised annular portion 334 for self-sealing similar to the contact surface 323 described for the inflow port 320. The self-sealing contact surface 323, 333 of both the filter inflow port 320 and outflow port 330 is similar to that previously described for FIGS. 1 and 2.

Through the several example embodiments provided, it is apparent that a number of further variations and modifications may be easily made to adapt a disposable inline water filter for use as a cartridge in a countertop water treatment device, without departing from the spirit and scope of the invention. Accordingly, the presented embodiments and descriptions are intended to be illustrative rather than limiting in purpose.

We claim:

1. A water treatment faucet assembly mountable through a hole on a horizontal surface, the water treatment faucet assembly comprising:

a valve assembly having a body with a passageway extending between an inlet port and an outlet port and a valve intermediate said inlet port and said outlet port movable between an open position and a closed position to control the flow of water, said body including a downwardly extending mounting portion fixed within the hole and extending below the horizontal surface for connection to a supply of water and an upwardly extending cylindrical portion with an external thread;

a disposable inline water filter including a shell defining an internal volume containing water treatment media and having at a lower end an inflow port and at an upper end an outflow port, said inflow port defining an opening with an internal thread for engagement with said external thread of said cylindrical portion of said body, said outflow port defining a cylindrical socket opening, said inflow port and said outflow port being spaced coaxially along an upright axis, said filter being positioned above said body with said inflow port in fluid communication with said outlet port when respective threads are engaged;

a tubular spout having a proximal cylindrical inlet end configured to mate with said socket opening and be held in fluid communication with said outflow port when inserted into said socket opening and a distal free outlet end for delivering filtered water; and, said upwardly extending cylindrical portion of said body comprising a pipe stub having an external thread and partially inserted into the top of said body of said valve assembly and engageable with said internal thread of said inflow port in the bottom of said disposable inline water filter.

* * * * *